United States Patent
Auer et al.

(10) Patent No.: US 7,315,040 B2
(45) Date of Patent: Jan. 1, 2008

(54) DEVICE FOR READING OUT X-RAY INFORMATION STORED IN A PHOSPHOR PLATE

(75) Inventors: Franz Auer, Rottenburg (DE); Werner Ihm, Isen (DE); Peter Schwelle, Weilheim (DE); Johannes Holzl, Grasbrunn (DE); Rudolf Werkstetter, Perach (DE)

(73) Assignee: AGFA-Gevaert Healthcare GmbH, Leverkusen (DE)

( * ) Notice: Subject to any disclaimer, the term of this patent is extended or adjusted under 35 U.S.C. 154(b) by 175 days.

(21) Appl. No.: 11/233,460

(22) Filed: Sep. 22, 2005

(65) Prior Publication Data

US 2006/0113500 A1  Jun. 1, 2006

(30) Foreign Application Priority Data

Sep. 22, 2004  (EP) ................... 04104602

(51) Int. Cl.
*G01N 23/04* (2006.01)
(52) U.S. Cl. ............... 250/589; 250/580; 250/581
(58) Field of Classification Search ........... 250/584, 250/585, 586, 587, 589
See application file for complete search history.

(56) References Cited

U.S. PATENT DOCUMENTS

| 2,931,284 | A | * | 4/1960 | Vinten | 396/479 |
| 4,201,919 | A | | 5/1980 | Schmidt | |
| 4,811,546 | A | * | 3/1989 | Takashima et al. | 53/284.5 |
| 5,308,994 | A | * | 5/1994 | Ohta et al. | 250/589 |
| 5,315,632 | A | * | 5/1994 | Flynn et al. | 378/167 |
| 5,721,436 | A | * | 2/1998 | Boeve et al. | 250/589 |
| 6,437,359 | B1 | | 8/2002 | Hall | |
| 2005/0104011 | A1 | | 5/2005 | Schindlbeck | |
| 2005/0218355 | A1 | | 10/2005 | Melzer et al. | |
| 2006/0091336 | A1 | * | 5/2006 | Muller et al. | 250/584 |

FOREIGN PATENT DOCUMENTS

| DE | 19646607 | 2/1998 |
| DE | 19752925 | 6/1999 |
| EP | 1209517 | 5/2002 |
| EP | 1321804 | 6/2003 |
| EP | 1324117 | 7/2003 |
| EP | 1324118 | 7/2003 |
| JP | 11160821 | 6/1999 |
| JP | 2000267209 | 9/2000 |

\* cited by examiner

*Primary Examiner*—David Porta
*Assistant Examiner*—Casey Bryant
(74) *Attorney, Agent, or Firm*—Houston Eliseeva LLP

(57) ABSTRACT

An X-ray reading device, for reading out X-ray information stored in a phosphor plate, includes an insertion device into which a cassette in which the phosphor plate is located, can be inserted, and an oblong insertion opening through which the phosphor plate located within the inserted cassette can be conveyed into an inside cavity of the X-ray reading device. In order to guarantee a reliable light seal with a simple closure mechanism which can accommodate different position tolerances and cassette formats, at least one closure mechanism is provided which can be moved in a longitudinal direction of the insertion opening to close at least one second section of the insertion opening.

20 Claims, 3 Drawing Sheets

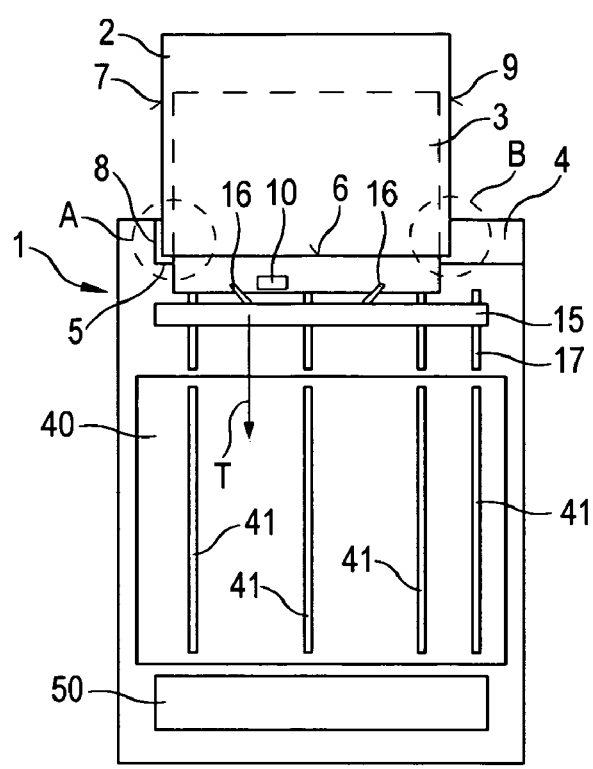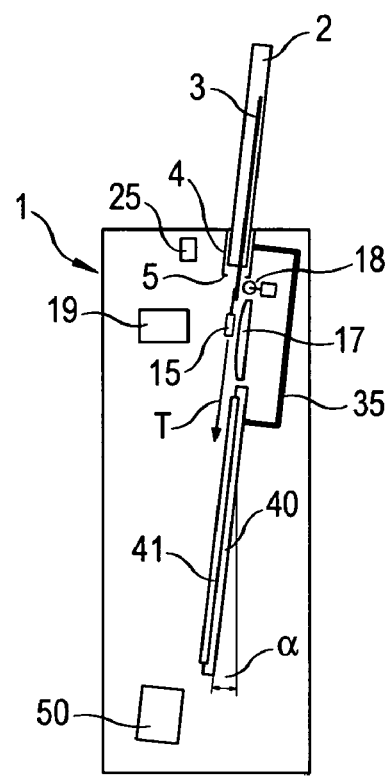
Fig. 1a  Fig. 1b
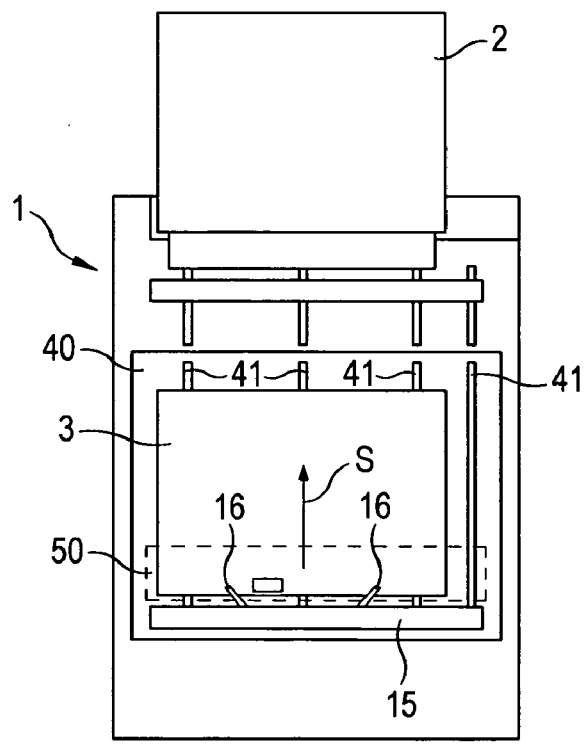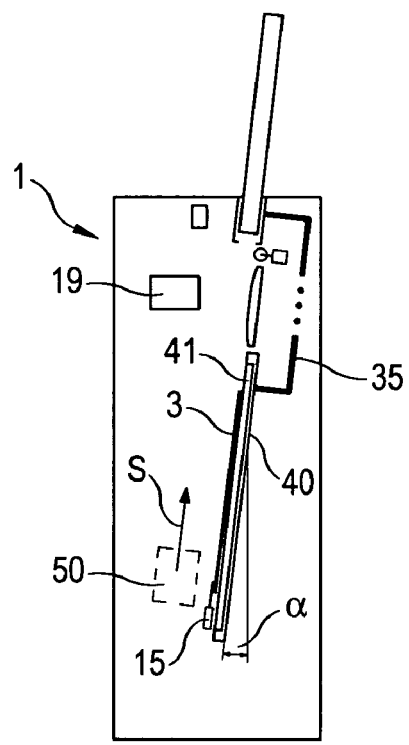
Fig. 2a  Fig. 2b

DEVICE FOR READING OUT X-RAY INFORMATION STORED IN A PHOSPHOR PLATE

The invention relates generally to a device for reading out X-ray information stored in a storage phosphor plate.

BACKGROUND OF THE INVENTION

Generic devices for reading out X-ray information stored in a phosphor plate are used, in particular for medical purposes, in the field of computer radiography (CR). Here, X-rays are recorded in so-called storage phosphors, whereby the X-ray radiation passing through an object, for example a patient, is stored as a latent picture in a storage phosphor layer. In order to read out the stored picture, the storage phosphor layer is irradiated with stimulation light, and so stimulated into emitting emission light, the intensity of which is dependent upon the respectively stored picture information. The emission light is collected by an optical detector and converted into electric signals which can be further processed as required and shown on a monitor or on a corresponding display unit, such as a printer.

U.S. Pat. No. 6,437,359, herein incorporated by reference in its entirety for background information only, describes a device of this genre into which a cassette, with a storage phosphor plate located within it, can be inserted. In order to prevent ambient light from penetrating into the inside of the device, a corresponding closure mechanism is provided in the region of the rear-side of the inserted cassette.

However, with the known closure mechanism, a sufficiently reliable light seal is not guaranteed for all applications. This applies in particular in the case of larger position tolerances of the inserted cassettes and with different cassette formats.

SUMMARY OF THE INVENTION

It is an object of the invention to provide a device for reading out X-ray information stored in a storage phosphor plate with which, in particular with different position tolerances and cassette formats, a reliable light seal is guaranteed with at the same time, a simple closure mechanism.

This and other objects are fulfilled in that at least one closure mechanism is provided which can be moved towards the inserted cassette in the longitudinal direction of an oblong or slit-shaped insertion opening, through which the storage phosphor plate located within the inserted cassette can be conveyed into the inside of the device, thus closing at least one section of the insertion opening, so that penetration of ambient light into the inside of the device is reduced or prevented.

According to the invention, the closure mechanism can be moved in the longitudinal direction of the insertion opening, so that a reliable light seal of the respective section of the insertion opening is guaranteed. Furthermore, it is made possible to adapt, in a simple manner, the closure mechanism to sections of the insertion opening to be closed with respectively different lengths, such as with different cassette formats or different position tolerances of the inserted cassette.

Additional features and advantages of the invention are given in the following description of preferred embodiments and examples of applications, wherein reference is made to the attached drawings.

BRIEF DESCRIPTION OF THE DRAWINGS

FIG. 1 shows a) a highly schematised representation of a device according to the principles of the invention at a first point in time in a front view and b) in a side view;

FIG. 2 shows a) the device illustrated in FIG. 1 at a second point in time in a front view and b) in a side view;

DETAILED DESCRIPTION OF THE PREFERRED EMBODIMENTS

Figure 3:
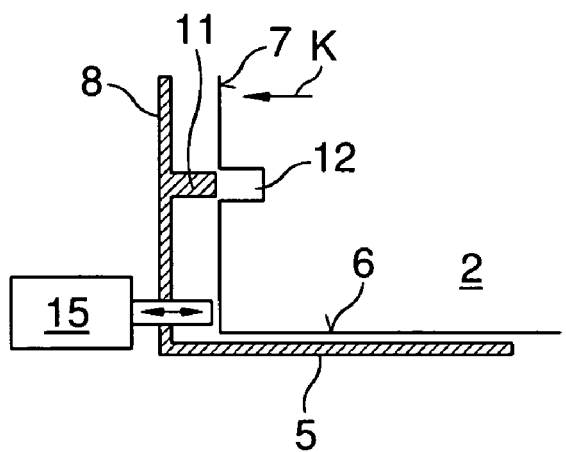
FIG. 3 shows a cross-section through an insertion device in a region of a stop in a front view.

In a first preferred embodiment of the invention, it is proposed that an insertion device into which the cassette with the storage phosphor plate located inside it can be inserted, and the insertion opening through which the storage phosphor plate located within the inserted cassette can be conveyed into the inside of the device, are of dimensions such that cassettes of different sizes can be inserted into the insertion device, or storage phosphor plates of different sizes can be conveyed through the insertion opening into the inside of the device. If a cassette with a format which is smaller than the largest format for which the insertion device and the insertion opening are designed, is inserted into the insertion device, the closure mechanism according to the invention makes it possible to easily and quickly adapt the respective section of the insertion opening to be closed to the respective cassette size.

In another preferred embodiment it is proposed that the insertion opening has a first section which is closed by the inserted cassette, and has a second section which is closed by the closure mechanism. The cassette preferably lies with a narrow side on the first section of the insertion opening, and the first section is closed by the inserted cassette. Appropriate seals such as sealing lips, can also be provided which lie against the wide sides of the cassette, to reduce or prevent ambient light from penetrating through the first section of the insertion opening in the region of the cassette. Overall, in this way a reliable light seal is provided which at the same time is simple in structure.

In the sense of the invention, a closure of the first or second section of the insertion opening means covering the respective section so that penetration of ambient light into the inside of the device is reduced or prevented. In particular, the first and/or second sections of the insertion opening are closed to form a light seal due to the inserted cassette or the closure mechanism.

In another preferred embodiment it is proposed that the closure mechanism is formed by a mechanically flexible cover. In this way, particularly easy manoeuvrability in the longitudinal direction of the oblong insertion opening is achieved. A flexible strip or roll of material can be a mechanically flexible cover which is essentially impervious to ambient light, such as a blind or a shutter which is made up from individual segments which move in relation to one another and which are essentially impervious to ambient light.

In another preferred embodiment, the closure mechanism is formed by a part of an endless belt running in the longitudinal direction of the insertion opening, whereby the belt includes a cut-out. This endless belt runs over two or more rolls, one of the rolls being in the form of a drive roll for driving the endless belt. The direction in which the endless belt runs in the region of the closure mechanism is essentially parallel to the longitudinal direction of the insertion opening. The cut-out in the endless belt is selected such that the inserted cassette is not touched by the endless belt running on both sides of the cassette. In this way a particularly simple and reliable light seal is provided.

In another preferred embodiment of the invention, a fixing element, which can be moved in the longitudinal direction of the insertion opening, is provided for fixing the cassette into the insertion device. The fixing element may be in the form of a wedge or pin. In this way, similar to the light seal, fixing of the cassette in the insertion device, independent of the position and format of the cassette, is guaranteed in a simple and reliable manner.

The fixing of the cassette in the insertion device by using a fixing element can happen here by a force closure and/or a form closure. In the simplest case of force closure fixing, the fixing element presses with a specific force against the inserted cassette, and in this way fixes it. In the case of a form locked fixing, the fixing element engages for example into an indentation located on the cassette so that the cassette is also fixed in its position. Particularly advantageous here is a combination of form closure and force closure.

Preferably, the fixing element is of a partially slanted or wedge-like form running perpendicularly to the longitudinal direction of the insertion opening. The consequence of this shape is that the cassette is pressed with one of its wide sides against the insertion device by the fixing element movable in the longitudinal direction of the insertion opening. In this way, when being fixed in the insertion device, the cassette is at the same time aligned with one of its wide sides.

In another preferred embodiment the fixing element is coupled with the closure mechanism so that the fixing element and the closure mechanism can be moved together in the longitudinal direction of the insertion opening towards the cassette, the cassette being fixed, and at the same time a section, in particular the second section, of the insertion opening is closed by the closure mechanism. In this simple way, the cassette is fixed in the insertion device at the same time as a light seal is created.

More advantageously, a stop is provided in the insertion device against which the cassette can lie with one of its narrow sides. This stop runs preferably perpendicularly to the longitudinal direction of the insertion opening. In this way the cassette, in particular with a force closure fixing, can be brought to a defined position by alignment against the stop.

The stop preferably has a first positioning element which is designed and/or positioned in such a way that it is complementary to a second positioning element provided on the cassette. In particular, this first positioning element is in the form of a protrusion on the stop which can engage in the second positioning element in the form of an indentation in the cassette. An exact alignment of the cassette against the stop is therefore only possible when the cassette has a specific orientation, whereby the second positioning element is positioned correspondingly to the first positioning element of the stop.

Using a sensing element provided in the insertion device, one can register the position of the cassette in the insertion device, in particular in relation to the stop, and additional information on the exact positioning of the cassette in the insertion device can also be gathered. Preferably, the sensing element is in the form of a linear sensing device which sends an electric signal, the height of which depends upon the distance of the cassette from the stop.

The invention is explained in greater detail by the following description of the procedure for reading out storage phosphor plates.

FIGS. 1a and 1b show an example of a device 1 according to the invention in a front and a side view. In the upper region of the housing of the device 1 there is an insertion device which in this example is in the form of a cassette holding slot 4. The cassette holding slot 4 is designed such that a cassette 2 inserted into the slot together with the storage phosphor plate 3 located within the same is inclined by an inclination angle in relation to the vertical. The inclination angle is preferably between approximately 3° and 15°.

In the lower region of the cassette holding slot 4 an oblong insertion opening 5 is provided through which the storage phosphor plate 3 located within the cassette 2 can be conveyed into the inside of the housing of the device 1. The insertion opening 5 is oblong or slit-shaped in form, its length being at least as great as the corresponding length of the largest storage phosphor plate format to be read out in the device 1. The width of the insertion opening 5 is selected to be sufficiently great so that the insertion opening 5 when removing it from the cassette 2, even with smaller position fluctuations, does not obstruct the storage phosphor plate 3.

The cassette 2 lies with a first narrow side 6 on the floor of the cassette-holding slot 4, and lies with a second narrow side 7 against a stop 8 which is provided at one end of the cassette holding slot 4.

Section A marked in FIG. 1a is shown in enlarged form in FIG. 3. On the stop 8 a protrusion 11 is provided which can engage into a corresponding, complementary indentation 12 in the cassette 2 and fix this in this way in the cassette holding slot 4. While the cassette 2 is being pushed against the stop 8 in direction K as it is being inserted into the cassette holding slot 4 and the protrusion 11 can engage in the indentation 12 in the cassette 2, a linear sensing device 15 is activated at the same time by the lower corner of the cassette 2, and the sensing device sends a signal corresponding to the respective position of the cassette 2. By using this signal it can be determined whether the cassette 2 is already lying fully against the stop 8.

If for example the cassette 2 is moved with a wrong narrow side in direction K towards the stop 8, the protrusion 11 of the stop 8 can not engage in a corresponding indentation in the cassette 2 so that the cassette 2 comes to stand approximately at the height of the protrusion 11. In this case, the linear sensing device 15 does not send a correspondingly high signal so that it is understood that the inserted cassette 2 is falsely orientated. In this case, a corresponding error signal is issued in a suitable display unit on the device.

Furthermore, through use of the linear sensing device 15 the exact position of the cassette 2 in relation to the stop 8 or the insertion opening 5 can be checked. The linear sensing device 15 can thus also register a slight tipping of the cassette 2 in relation to the horizontal.

The combination of the protrusion 11 against the stop 8 and the corresponding indentation 12 in the cassette 2 on the one hand with the linear sensing device 15 in the region of the stop 8 on the other hand thus makes it possible in a simple way to provide reliable recognition of the correct orientation and exact position of an inserted cassette 2. Only when the linear sensing device 15 sends a corresponding signal will further process steps be initiated for the processing of the storage phosphor plate 3 located within the cassette 2.

In a next step the cassette is fixed in the region of the third narrow side 9 of the cassette 2 lying opposite the second narrow side 7 in conjunction with a light seal on the insertion opening 5. In the following this is described in greater detail with reference to FIGS. 4 to 6.

Figure 5:
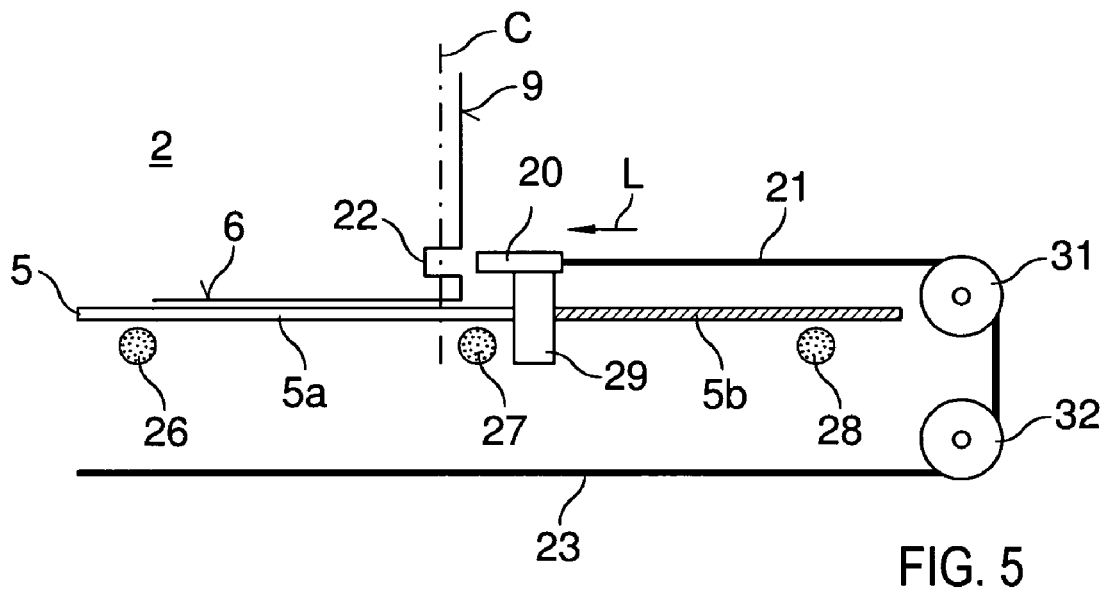
FIG. 5 shows a cross-section through an insertion device in a region of a fixing element and a closure mechanism in a front view.

FIG. 5 shows section B marked in FIG. 1a in enlarged form. A fixing element 20 attached to an endless belt 23 is moved in the longitudinal direction L of the insertion opening 5 towards the third narrow side 9 of the cassette 2, and here can engage in another indentation 22 of the cassette 2, and in this way fix the cassette 2 by form-locking. By using a corresponding pressing force, a force closure fixing of the cassette 2 is achieved at the same time, in particular by pressing onto the stop 8 located on the opposite second narrow side 7.

The light seal of the insertion opening 5 is created here both by the first narrow side 6 of the cassette 2 which covers a first section 5a of the insertion opening 5 so as to prevent light penetration, and by a closure mechanism 21 which is formed by a part of the endless belt 23 and covers a second section 5b of the insertion opening 5.

Figure 4:
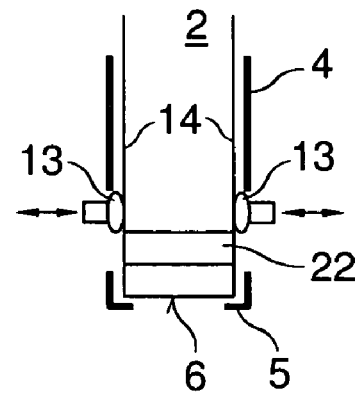
FIG. 4 shows a cross-section through an insertion device with a cassette located within the device in a side view.

Alternatively, or in addition, the first section 5a of the insertion opening 5 can be sealed against light penetration by other suitable means. One possible variation is shown in FIG. 4 which shows a cross-section through the insertion device 4 with the cassette 2 located within it, along the cross-section level C (see FIG. 5) in a side view. In this example, sealing lips 13 are provided which can extend sideways into the inside of the cassette holding slot 4 and lie against the wide sides 14 of the cassette 2. In this example, the sealing lips 13 are in the form of hollow lips and preferably respectively run parallel to the longitudinal direction L (see FIG. 5) of the insertion opening 5 or to the first narrow side 6 of the cassette 2.

In FIG. 4 one can also see the indentation 22 in which the fixing element 20 (see FIG. 5) can engage and thus fix the cassette 2 by form closure and, if required, force closure.

In the example given in FIG. 5, photo sensors 26 to 28 are also provided which can be interrupted by a tab 29 attached to the fixing element 20. These photo sensors 26 to 28 are correspondingly allocated to the different cassette formats to be processed so that a photo sensor 26, 27 or 28 is only interrupted by the tab 29 and a corresponding signal sent if a cassette permissible for this device with a corresponding format is inserted in the correct position and with the right orientation. In association with the stop 8 described in greater detail in connection with FIG. 3, even greater reliability for the recognition of the right orientation and correct position of the respectively inserted cassette 2 is guaranteed by the photo sensors 26, 27 and 28.

The endless belt 23 is preferably in the form of a toothed belt. In order to guide and drive the endless belt 23, rollers 31 and 32 are provided, one of the rollers 31 or 32 being in the form of a roller drive which can move the endless belt 23 and so also the closure mechanism 21 as well as the fixing element 20 attached to it parallel to the longitudinal direction L of the insertion opening 5.

Figure 6:
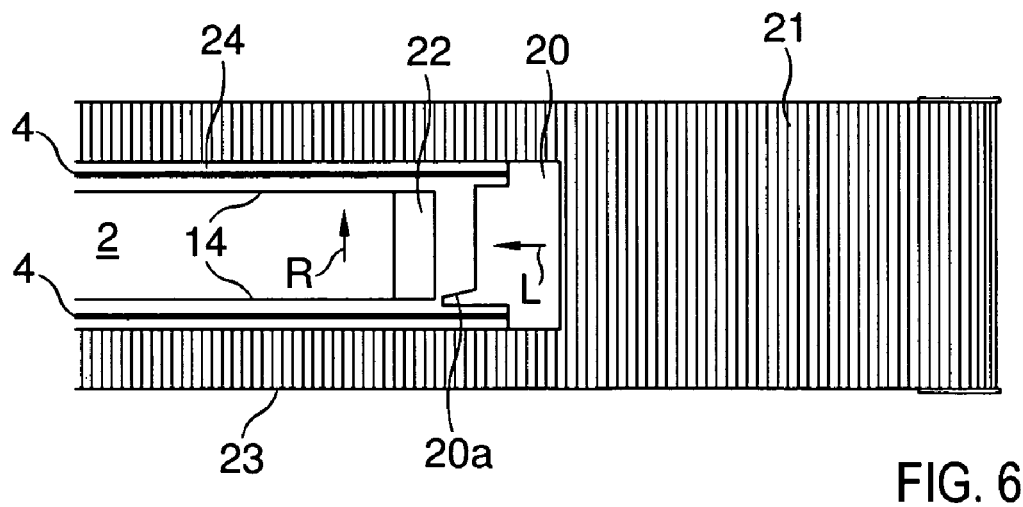
FIG. 6 shows a cross-section through an insertion device in a region of a fixing element and a closure mechanism in an overhead view.

FIG. 6 shows an overhead view of the section of the device according to the invention shown in FIG. 5. As can be seen, the endless belt 23 has a cut-out 24 in the region of the inserted cassette 2 so that this can run on both sides of the cassette 2. On one end of the cut-out 24 the fixing element 20 is attached, which together with the closure mechanism 21 attached onto this can be moved toward the cassette 2 or away from the cassette 2. The fixing element 20 has a region 20a which runs at a slant or in the form of a wedge, so that the cassette 2 is pressed in a direction R against a wall of the cassette holding slot 4 when the fixing element 20 extends into the indentation 22 in the cassette 2.

The fixing element 20 is preferably fastened onto a slide which is movably mounted with rollers on tracks running on both sides of the cassette 2 (not shown).

On the edge of the storage phosphor plate 3 (see FIG. 1a) there is an electronic storage unit 10 for storing data relating to the format of the cassette 2, the storage phosphor plate 3 and the total thickness of the storage phosphor plate 3 which is made up from a substrate material and a storage phosphor layer located on top of this, and typically has a total thickness of between approximately 1 and 3 mm.

The electronic storage unit 10 is preferably in the form of a so-called RF-Tag which can be read out by an RF reader 25 by means of radio frequency radiation. The data on the format of the cassette 2 read out from the electronic storage unit 10 can be compared with the information obtained from the photo sensors 26 to 28 and tested for plausibility. If there is, for example, a non-desirable object between the third narrow side 9 of the cassette 2 and the fixing element 20, such as a hand or a finger of a user, the photo sensor signal obtained here is not consistent with the cassette format established in the electronic storage unit 10. In this case, the fixing process can be interrupted, and a corresponding error signal is issued.

Furthermore, a so-called clamping force sensor (not shown) can be positioned on the circulating endless belt 23, and this can register the tension of the endless belt 23 when fixing the cassette 2. With the belt tension registered, the endless belt 23 drive can be controlled in such a way that the fixing element 20 presses with a pre-determinable force onto the third narrow side 9 of the cassette 2, and in so doing, fixes it. Typical forces here are those between 10 and 100 N. In this way, even with cassettes of different formats, a format-independent pressing force and fixing of the cassette in the cassette holding slot 4 is achieved. Furthermore, it can be guaranteed by a corresponding specification of the pressing force that the cassette 2 is not damaged by excessive forces while being fixed. Furthermore, the risk of injury is reduced in cases where a body part, such as a hand or a finger of a user inadvertently comes between the cassette 2 and the fixing element 20 or stop 8.

On the first narrow side 6 of the cassette 2 a flap (not shown) is provided which closes the cassette 2 to form a light seal. This flap is unlocked with a suitable opening mechanism (not shown), the storage phosphor plate 3 at the same time being locked in the cassette 2 so that it can not fall out of the cassette 2. This type of cassette with a corresponding unlocking and locking mechanism is described in greater detail in European patent application number 01104202.1, herein incorporated by reference in its entirety for background information only.

Preferably, the opening of the flap, which preferably takes place by a simple translatory movement of corresponding opening pins in the region of the first narrow side 6 of the cassette 2, is mechanically coupled with the seal on the wide sides 14 of the cassette 2 by the sealing lips 13 already described above (see FIG. 4).

A conveyance device 15 can now approach the cassette 2 and the storage phosphor plate 3 located within it, and grasp the latter by grasping arms 16. Hooks and/or cut-outs suitable for this are provided on the storage phosphor plate 3, as described in greater detail in particular in the published European patent applications EP 1 321 804 and EP 1 324 118, both herein incorporated by reference in their entirety for background information only.

The storage phosphor plate 3 which is still locked in the cassette 2 can now be unlocked and removed from the cassette 2 by a downwards movement of the conveyance device 15 in conveyance direction T. The conveyance direction T here also involves a final inclination angle in relation to the vertical, and is preferably selected such that the storage phosphor plate 3 can be removed from the cassette and conveyed essentially without any change in direction, i.e. on just one conveyance level.

The storage phosphor plate 3 is now conveyed in conveyance direction T to a support 40. Spacers 41 are provided on the support 40 which are extended over the support 40 during conveyance of the storage phosphor plate 3. Due to its own weight, the storage phosphor plate 3 then lies on the spacers 41 and is carried by these with very little friction.

Figure 7:
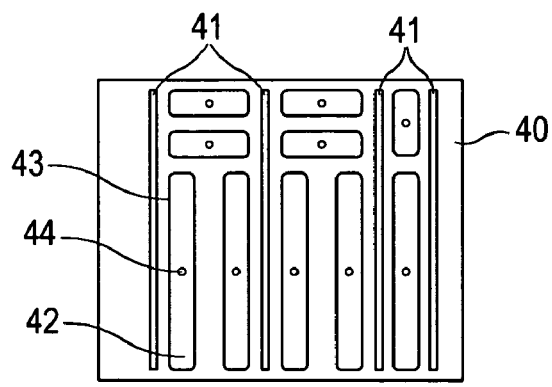
FIG. 7 shows a preferred embodiment of a support.

The structure of a support 40 formed in this way is shown in detail in FIG. 7. As can be seen, as well as the already mentioned retractable and extendable spacers 41, the support 40 has several segments 42 by which the storage phosphor plate 3 located on the support 40 can be pulled onto the support 40. In the example shown here, the individual segments 42 each include a rubber edging strip 43 and a suction nozzle 44 within each segment 42 which is connected to a vacuum pump (not shown). By using an appropriate arrangement of segments 42 of different sizes, the pulling and suction effect of which can preferably be controlled separately, it is possible to pull the storage phosphor plate 3 onto the support 40 in a simple manner adapted to the respective format.

The support 40 is also inclined by an inclination angle α in relation to the vertical.

If the storage phosphor plate 3 has arrived at the region of the support 40, the plate, due to its own weight, can lie on the support 40 or the extended spacers 41 without additional guiding or pressing elements being required. The spacers 41 can now be retracted into the support 40 and the storage phosphor plate 3 moves closer to the support 40 due to its own weight, and is finally additionally pulled onto the support 40 by turning on a vacuum at the corresponding suction nozzles 44 of the individual segments 42.

This state is illustrated in FIGS. 2a and 2b. In this example of an embodiment, the conveyance device 15 is configured in such a way that it furthermore holds the storage phosphor plate 3 with its grasping arms 16 while the plate already lies securely on the support 40. In this way a particularly secure hold of the storage phosphor plate 3 on the support 40 is guaranteed. Moreover, in this way a new grasping process can be omitted before starting to convey the storage phosphor plate 3 back into the cassette 2.

When the storage phosphor plate 3 lies securely on the support 40, a read-out device 50 moves upwards out of its original parking position (see FIGS. 1a and 1b) beneath the lower end of the support 40 in direction S onto the storage phosphor plate 3. At the same time, using a corresponding spacing mechanism (not shown), a corresponding distance between the read-out device 50 and the support 40 is set, the distance being set dependent upon the overall thickness of the storage phosphor plate 3 read out from the electronic storage unit 10.

The read-out device 50 can now read out, line for line, the X-ray information stored in the storage phosphor plate 3 while it moves in the direction S over the storage phosphor plate 3. The read-out device 50 is preferably a so-called line scanner with which a whole line of the storage phosphor plate 3 is respectively stimulated with stimulation light, and the emission light thus produced is collected by a linear, locally releasing detector. This type of line scanner is described in greater detail for example in the German disclosure document DE 197 52 925, herein incorporated by reference in its entirety for background information only.

Following the read-out from the storage phosphor plate 3, the distance of the read-out device 50 from the support 40 is increased again, and the read-out device 50 travels back to its original parking position at the lower end of the support 40. The storage phosphor plate 3 is released from the support 40 when air is let into or pumped into the respective suction nozzles 44 of the individual segments 42.

Before starting the return conveyance, the spacers 41 are extended out of the support 40 again. The storage phosphor plate 3 can now be conveyed back into the cassette 2 using the conveyance device 15.

While being conveyed back, any remaining X-ray information in the storage phosphor plate 3 is deleted by a deletion lamp 19 located in the region beneath the cassette holding slot 4.

Between the support 40 and the cassette holding slot 4 guide elements are provided which, in particular during the return conveyance, ensure that the storage phosphor plate 3 is reliably guided. Due to its own weight, the storage phosphor plate 3 here lies against the guide elements which in the example shown are in the form of guiding skids 17 and guide rolls 18.

When the storage phosphor plate 3 is fully inserted in the cassette 2 once again, it can once again be locked into the cassette with the locking mechanism already described above. The grasping arms 16 of the conveyance device 15 now let go of the storage phosphor plate 3, and the conveyance device 15 travels back to its parking position. The cassette 2 is now closed by shutting the flap described above, the sealing lips 13 (see FIG. 4) are moved back from the wide sides 14 of the cassette 2, and the fixing element 20 releases the cassette 2 along with the closure mechanism 21 located on the same, and the cassette can now be removed again from the cassette holding slot 4 by a user.

Preferatised, a coupling device 35—only shown in a highly schematised form in FIGS. 1b and 2b—is provided which can mechanically couple the cassette holding slot 4 with the support 40 during the conveyance of the storage phosphor plate 3 (see FIG. 1b) and mechanically uncouple it while the storage phosphor plate 3 is being read out. For simplification, the mechanical uncoupling is symbolised by the dotted line of the coupling device 35 in FIG. 2b.

In this way, on the one hand, particularly secure conveyance of the storage phosphor plate 3 from the cassette to the support 40 is guaranteed because the cassette 2 located within the cassette holding slot 4 and the support 40 can not move relative to one another due to the mechanical coupling.

When the mechanical uncoupling of the support 40 is suspended movably, e.g. by elastic elements, in the housing of the device 1, it is also possible for vibrations of the housing, in particular due to external impacts or shaking, to be transferred to the support 40. In this way, a particularly secure and reliable read-out of the storage phosphor plate 3 is guaranteed.

In an alternative embodiment of the device shown in FIGS. 1 and 2, the storage phosphor plate 3 is read out while this is being conveyed by the conveyance device 15 and 16 on a conveyance level inclined in relation to the vertical. The read-out device 50 here is arranged in such a way (not shown) that the storage phosphor plate 3 is conveyed past the read-out device 50 and can thus be read out by the same while the storage phosphor plate 3 is conveyed downwards away from the cassette 2 or upwards towards the cassette 2. The read-out device 50 can for example be located near the deletion device 19 drawn in in FIGS. 1 and 2 so that the storage phosphor plate 3 can be read out when it is removed from the cassette 2, and deleted when it is conveyed back into the cassette 2.

Figures 8A, 8B, 8C:
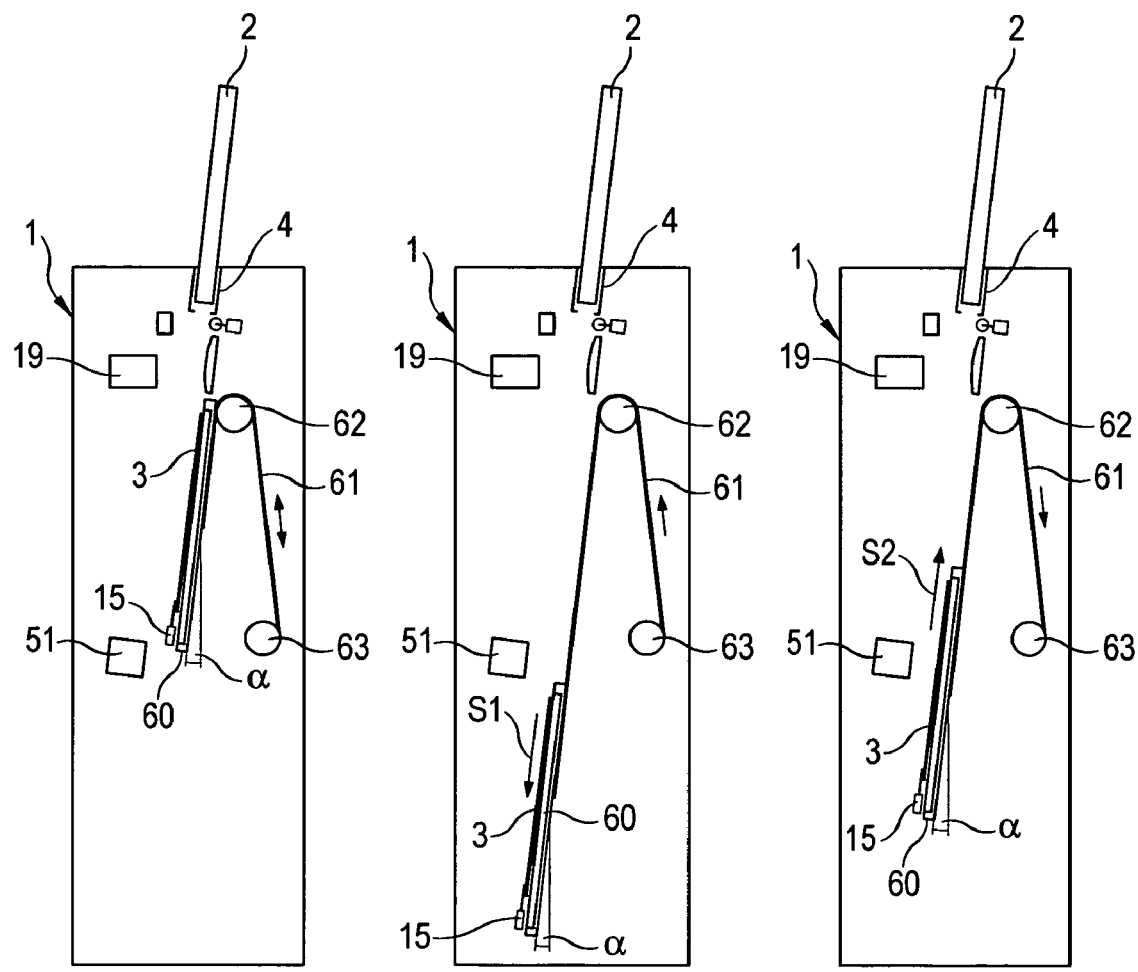
FIG. 8 shows in a) to c) another embodiment of a device according to the principles of the invention in a side view at a first, second and third point in time.

In FIGS. 8*a*, 8*b* and 8*c*, an alternative embodiment of the device according to the invention is respectively shown in a side view. The fixing of the cassette 2 in the cassette holding slot 4 and the removal of the storage phosphor plate 3 from the cassette 2 by the conveyance device 15 happen according to the above embodiments in connection with FIGS. 1 to 6.

Unlike the examples of embodiments described above, the support 60 on which the storage phosphor plate 3 is located during the read-out is not securely fastened, but is conveyed past the securely fastened read-out device 51 by a suitable drive device. In the examples shown, the drive device includes a cable or strap winch 61 which is attached to the support 60, and is turned round by a pulley 62, and driven by a drive roll 63.

At the point in time illustrated in FIG. 8*a*, the storage phosphor plate 3 lies flat on the support 60 which is inclined by an inclination angle α in relation to the vertical. In order to guarantee a secure hold of the storage phosphor plate 3 on the support 60 during read-out, the support 60 is provided with appropriate pulling devices, such as suction nozzles (as in FIG. 7) or suction cups, or holding devices. Furthermore the conveyance device 15, with which the storage phosphor plate 3 is removed from the cassette 2 and conveyed to the support 60, is also engaged with the storage phosphor plate 3 by means of which the latter is additionally held.

By rotating the drive roll 63, the storage phosphor plate 3, together with the support 60, can now be lowered in direction S1. A point of time during the lowering is shown in FIG. 8*b*. Here, the storage phosphor plate 3 is moved in direction S1 past the securely fastened read-out device 51 and can be read out by the same.

The read-out device 51, as in the case of the read-out device 50 (FIGS. 1 and 2) can be a so-called line scanner. Preferably, the read-out device 51 is in the form of a so-called flying spot scanner with which a laser beam deflected by a rotating mirror stimulates the storage phosphor plate point by point, and the emission light respectively stimulated by a photomultiplier is collected.

In an alternative embodiment, the storage phosphor plate 3 can only be read out on its way back, as it is moved past the read-out device 51 in direction S2 (see FIG. 8*c*). Dependent upon the design of the drive device 61 to 63, in particular of the drive used for the drive roll 63, in this way, the storage phosphor plate 3 can be particularly reliably conveyed past the read-out device 51 with very few fluctuations.

Independent of the respective movement direction S1 or S2, the storage phosphor plate 3 is inclined by inclination angle α in relation to the vertical during read-out.

After the read-out, the storage phosphor plate 3 has returned to the position shown in FIG. 8*a*, and can—similar to the examples in FIGS. 1 and 2—be conveyed back by the conveyance device 15 into the cassette 2. Any information remaining in the storage phosphor plate 3 is deleted here by turning on the deletion lamp 19.

The drive device described in FIGS. 8*a*, 8*b* and 8*c* can also be replaced by other suitable drive devices. For example, the support 60 from a so-called spindle drive (not shown) can be moved on a level inclined in relation to the vertical. Here, the support 60 is set in motion by one or more rotating shafts or spindles, arranged parallel to the support 60, driven by a motor.

The invention claimed is:

1. An X-ray reading device for reading out X-ray information stored in a phosphor plate located in a cassette, said X-ray reading device comprising:
   an insertion device into which the cassette is inserted;
   an oblong insertion opening through which the phosphor plate located within the inserted cassette is conveyed into an inside cavity of the X-ray reading device;
   at least one closure mechanism that moves in a longitudinal direction to the insertion opening to close at least one section of the insertion opening; and
   a fixing element movable in the longitudinal direction of the insertion opening for fixing the cassette in the insertion device, wherein the fixing element has a partially slanted or wedge-like shape running perpendicularly to the longitudinal direction of the insertion opening to press a wide side of the cassette against the insertion device.

2. The device according to claim 1, wherein the insertion device and the insertion opening are of dimensions such that cassettes of different sizes can be inserted into the insertion device, and phosphor plates of different sizes can be conveyed through the insertion opening.

3. The device according to claim 1, wherein the insertion opening includes a first section which is closed by the inserted cassette, and a second section which is closed by the closure mechanism.

4. The device according to claim 3, wherein a first narrow side of the inserted cassette lies on the first section of the insertion opening, and thus closes the first section.

5. The device according to claim 1, wherein a first and/or second section of the insertion opening is closed by either the cassette or the closure mechanism to form a light seal.

6. The device according to claim 1, wherein the closure mechanism comprises a mechanically flexible cover.

7. The device according to claim 1, wherein the closure mechanism comprises an endless belt having a cut-out and running in the longitudinal direction of the insertion opening.

8. The device according to claim 1, wherein the fixing element is coupled to the closure mechanisms, fixing element and the closure mechanism being moved together in the longitudinal direction of the insertion opening towards the cassette, the cassette being fixed, and at the same time the at least one section of the insertion opening is closed by the closure mechanism.

9. The device according to claim 1, wherein the cassette comprises narrow sides and the insertion device further comprises a stop against which the cassette lies with one the narrow sides.

10. The device according to claim 9, wherein the stop includes a first positioning element which is designed and/or positioned to be complementary to a second positioning element provided on the cassette.

11. The device according to claim 10, wherein the first positioning element is in the form of a protrusion on the stop, the protrusion of the stop being able to engage with a second positioning element in the form of an indentation in the cassette.

12. The device according to claim 1, further comprising a sensing element which registers a position of the cassette in the insertion device.

13. The device according to claim 6, wherein the mechanically flexible cover comprises a flexible strip.

14. The device according to claim 6, wherein the mechanically flexible cover comprises a roll.

15. The device according to claim 6, wherein the mechanically flexible cover comprises a blind.

16. The device according to claim 6, wherein the mechanically flexible cover comprises a shutter.

17. A method for inserting a phosphor plate located in a cassette into an X-ray reading device for reading out X-ray information stored in the phosphor plate, the method comprising:

receiving the cassette in an insertion device;

conveying the phosphor plate through an oblong insertion opening into an inside cavity of the X-ray reading device;

moving at least one closure mechanism in a longitudinal direction to the insertion opening to close at least one section of the insertion opening; and fixing the cassette in the insertion device by moving a fixing element in the longitudinal direction of the insertion opening by pressing a wide side of the cassette against the insertion device with a slanted or wedge-like surface of the fixing element, the surface running perpendicularly to the longitudinal direction of the insertion opening.

18. A method as claimed in claim 17, further comprising moving the fixing element and the closure mechanism together in the longitudinal direction of the insertion opening towards the cassette with the cassette being fixed, and at the same time the at least one section of the insertion opening is closed by the closure mechanism.

19. A method as claimed in claim 17, further comprising abutting the cassette against a stop.

20. A method as claimed in claim 19, wherein the step of abutting the cassette against the stop comprises a protrusion on the stop engaging an indentation in the cassette.

* * * * *

UNITED STATES PATENT AND TRADEMARK OFFICE
CERTIFICATE OF CORRECTION

PATENT NO. : 7,315,040 B2  Page 1 of 1
APPLICATION NO. : 11/233460
DATED : January 1, 2008
INVENTOR(S) : Franz Auer et al.

It is certified that error appears in the above-identified patent and that said Letters Patent is hereby corrected as shown below:

In Claim 8, Column 10, line 46, delete "mechanisms," and insert in place thereof --mechanism, the--.

Signed and Sealed this

Twenty-seventh Day of May, 2008

JON W. DUDAS
*Director of the United States Patent and Trademark Office*